(12) United States Patent
Florence

(10) Patent No.: US 7,357,593 B1
(45) Date of Patent: Apr. 15, 2008

(54) TUBE CONNECTOR

(76) Inventor: Brian A. Florence, 126 Lauries La., Marstons Mills, MA (US) 02648

( * ) Notice: Subject to any disclaimer, the term of this patent is extended or adjusted under 35 U.S.C. 154(b) by 218 days.

(21) Appl. No.: 11/105,269

(22) Filed: Apr. 14, 2005

(51) Int. Cl.
*B25G 3/18* (2006.01)
*F16B 21/00* (2006.01)
(52) U.S. Cl. .................. 403/330; 403/304; 403/321; 403/322.4; 403/374.5; 403/DIG. 9
(58) Field of Classification Search ............. 403/300, 403/302, 303, 304, 321, 322.4, 330, 33, 374.5, 403/349, DIG. 9; 292/161, 143, 150, 153, 292/66, DIG. 60
See application file for complete search history.

(56) References Cited

U.S. PATENT DOCUMENTS

| | | |
|---|---|---|
| 534,321 A | 2/1895 | Cummings |
| 986,761 A | 3/1911 | Roscoe |
| 1,263,131 A | 4/1918 | Seelye |
| 1,331,806 A | 2/1920 | Curtis |
| 1,530,225 A | 3/1925 | Belakoy |
| 2,278,308 A * | 3/1942 | Fairchild .................. 403/182 |
| 2,462,382 A * | 2/1949 | Gleason ..................... 403/43 |
| 2,527,256 A * | 10/1950 | Jackson .................... 403/319 |
| 2,550,018 A * | 4/1951 | Weiland et al. ........... 24/71 CT |
| 2,554,680 A | 5/1951 | Morris et al. |
| 2,682,414 A | 6/1954 | Richardson |
| 2,793,902 A | 5/1957 | Govan, Jr. |
| 2,904,141 A * | 9/1959 | Henrichs ................... 403/321 |
| 3,004,362 A | 10/1961 | Day |
| 4,079,965 A | 3/1978 | Moughty et al. |
| 4,162,132 A | 7/1979 | Kress et al. |
| 4,224,786 A | 9/1980 | Langlie et al. |
| 4,406,559 A | 9/1983 | Geertsema et al. |
| 4,441,747 A | 4/1984 | Bryington, II |
| 4,466,377 A | 8/1984 | Kolb et al. |
| 4,565,398 A | 1/1986 | Poulin |
| 4,720,206 A | 1/1988 | Aquilina |
| 4,786,095 A | 11/1988 | Dumont |
| 5,152,559 A * | 10/1992 | Henrichs .................... 292/113 |
| 5,168,693 A | 12/1992 | Ingvardsen |
| 5,185,992 A | 2/1993 | Garcia |
| 5,272,788 A | 12/1993 | Gilstrap |
| 5,288,161 A | 2/1994 | Graves et al. |
| 5,415,448 A | 5/1995 | Keathley |
| 5,603,584 A | 2/1997 | Schuele |
| 5,620,212 A * | 4/1997 | Bourne et al. .............. 292/113 |
| 5,641,237 A | 6/1997 | Albert et al. |
| 5,690,181 A | 11/1997 | Shu |
| 5,743,580 A | 4/1998 | Evans |
| 5,809,615 A | 9/1998 | Schbeider et al. |
| 5,816,633 A | 10/1998 | Odom |
| 5,927,779 A | 7/1999 | Aquilina |
| 6,220,639 B1 | 4/2001 | Aquilina |
| 6,269,542 B1 | 8/2001 | Gamba |
| 6,315,488 B1 | 11/2001 | Parker |
| 6,328,361 B1 | 12/2001 | Spear |
| 6,332,635 B1 | 12/2001 | Harpell |
| 6,439,630 B1 | 8/2002 | Eatmon |

* cited by examiner

*Primary Examiner*—Robert J. Sandy
*Assistant Examiner*—Jay R Ripley
(74) *Attorney, Agent, or Firm*—John P. McGonagle

(57) ABSTRACT

A tube connector for connecting one tubular section to another tubular section. A hook apparatus is joined to a first tubular section and a latching apparatus joined to a second tubular section. The latching apparatus of the second tubular section removably engages the hook apparatus of the first tubular section forming a sturdy joint able to hold up under vigorous activity. The latch and hook are easily joined and locked into place. The second tubular section covers the engaged latch and hook joint.

3 Claims, 4 Drawing Sheets

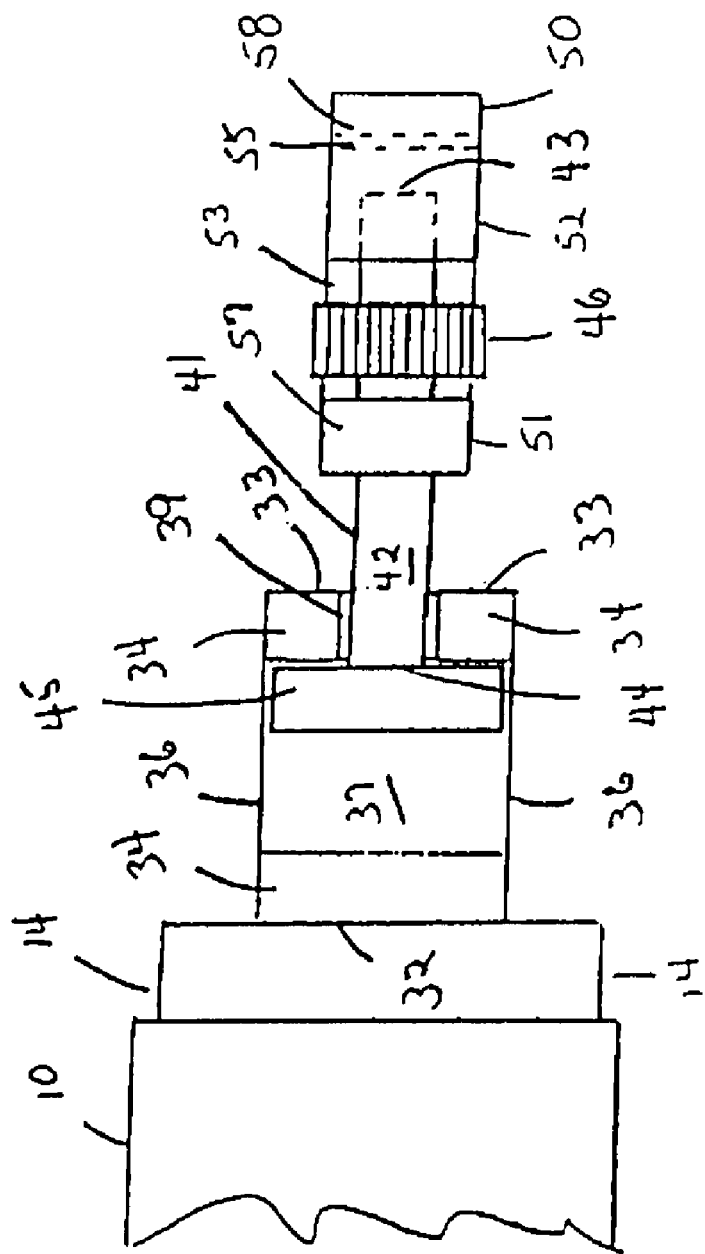

TUBE CONNECTOR

BACKGROUND OF THE INVENTION

This invention relates to connectors, and in particular, to an apparatus for connecting two tubes.

Many tubular objects require quick and strong connections to corresponding tubular objects. For example, cable conduits, staging, and tools come in parts which require connecting means. Cable conduits come in sections which require interconnection. Staging also comes in sections which require interconnection. Tools are more efficient if different tool heads can be interconnected at various times to a single tool handle.

Tools used for garden, cultivation, dirt and snow work generally employ elongated handles. Most owners of such tools do not own just one tool but will own a plurality of such tools. The transportation and storage of such tools is problematic because of the space required by such tools. Retail sales of such tools and corresponding shipment of such products can become expensive. Retail show rooms with the demand for space will only be able to show a limited number of such tools. Purchasers will generally not have room in their vehicles to take home such products. Delivery and shipment of such tools are expensive.

SUMMARY OF THE INVENTION

The present invention addresses the above problems by providing a system allowing one tubular section to be quickly and firmly connected to another tubular section. While tubular sections generally have a circular cross section, they could also have square or rectangular cross sections. The present invention may be used with any tubular section having any type of cross section.

The present invention accomplishes this by joining a hook apparatus to a first tubular section and a latching apparatus to a second tubular section. The latching apparatus of the second tubular section removably engages the hook apparatus of the first tubular section forming a sturdy joint able to hold up under vigorous activity. The latch and hook are easily joined and locked into place. The second tubular section covers the engaged latch and hook joint.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 4 is a top view of the invention without the lever.

DETAILED DESCRIPTION OF INVENTION

Figure 1:
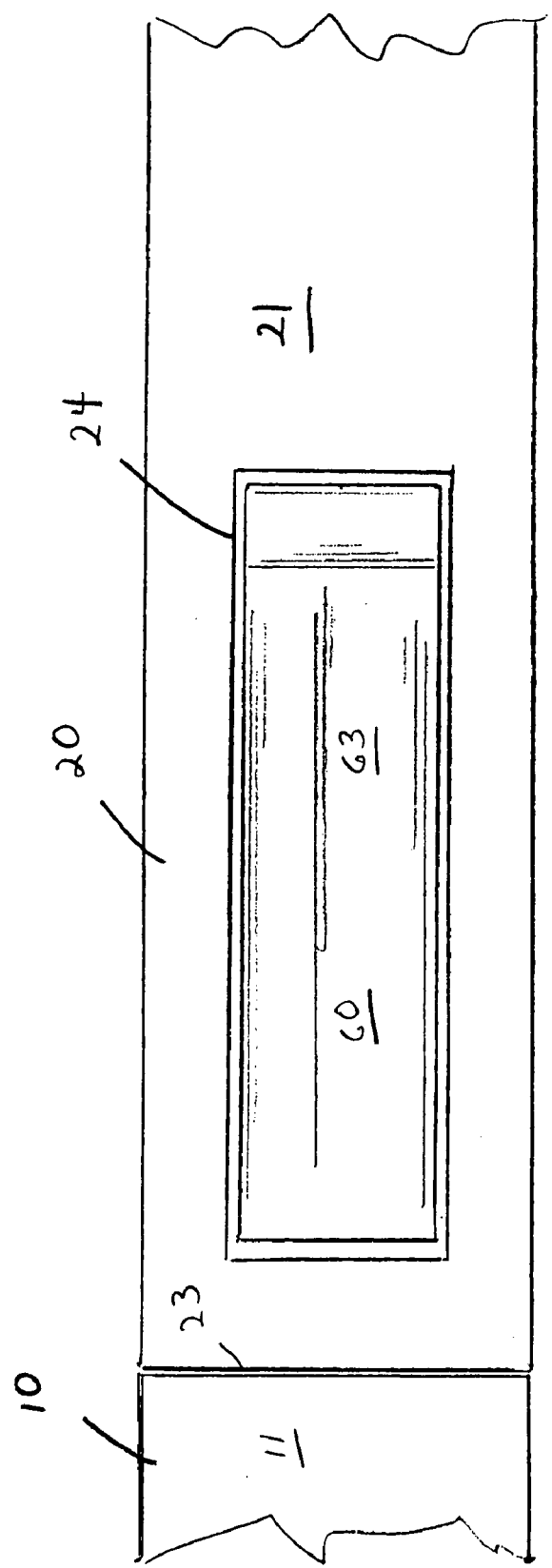
FIG. 1 is a top view of the invention fully engaged.
Figure 2:
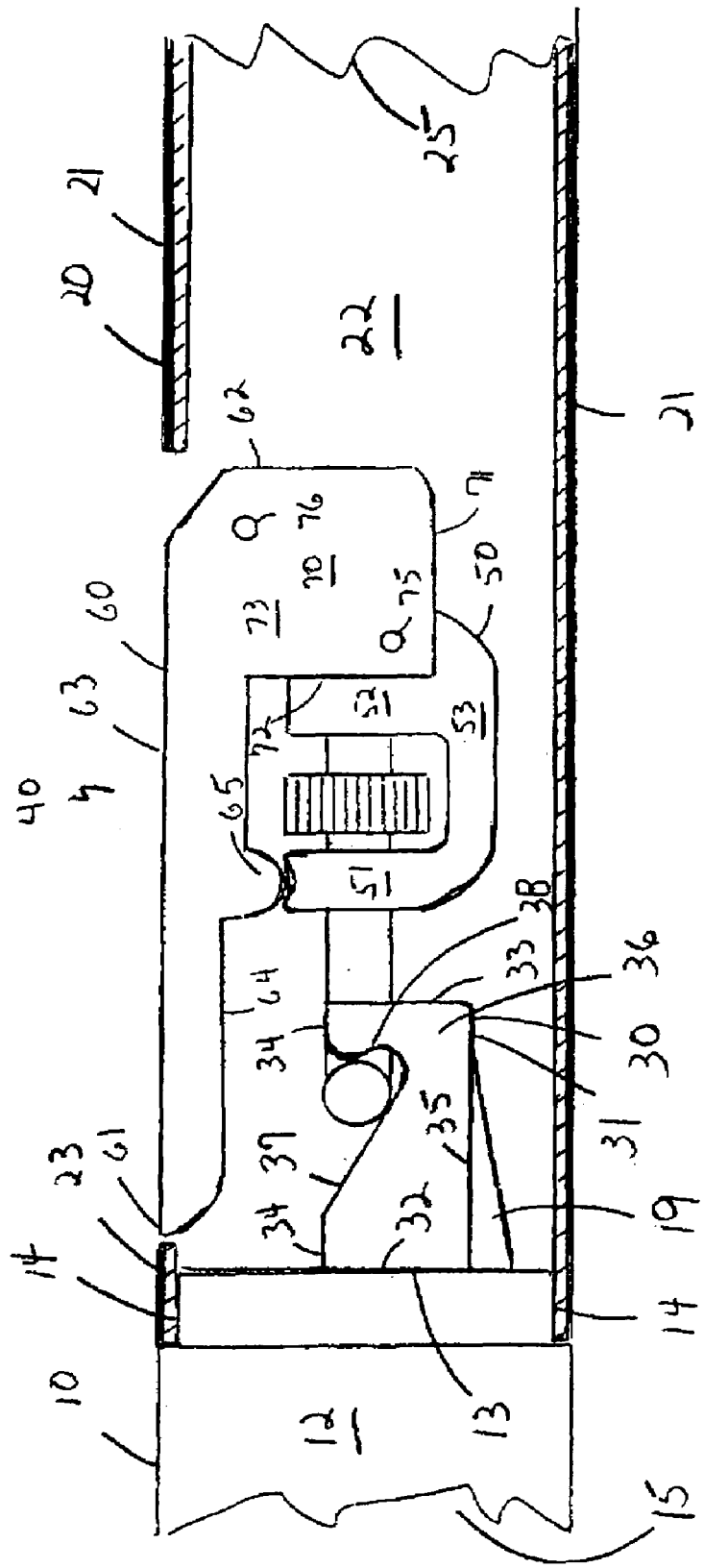
FIG. 2 is a cross sectional side view of the fully engaged invention.
Figure 3:
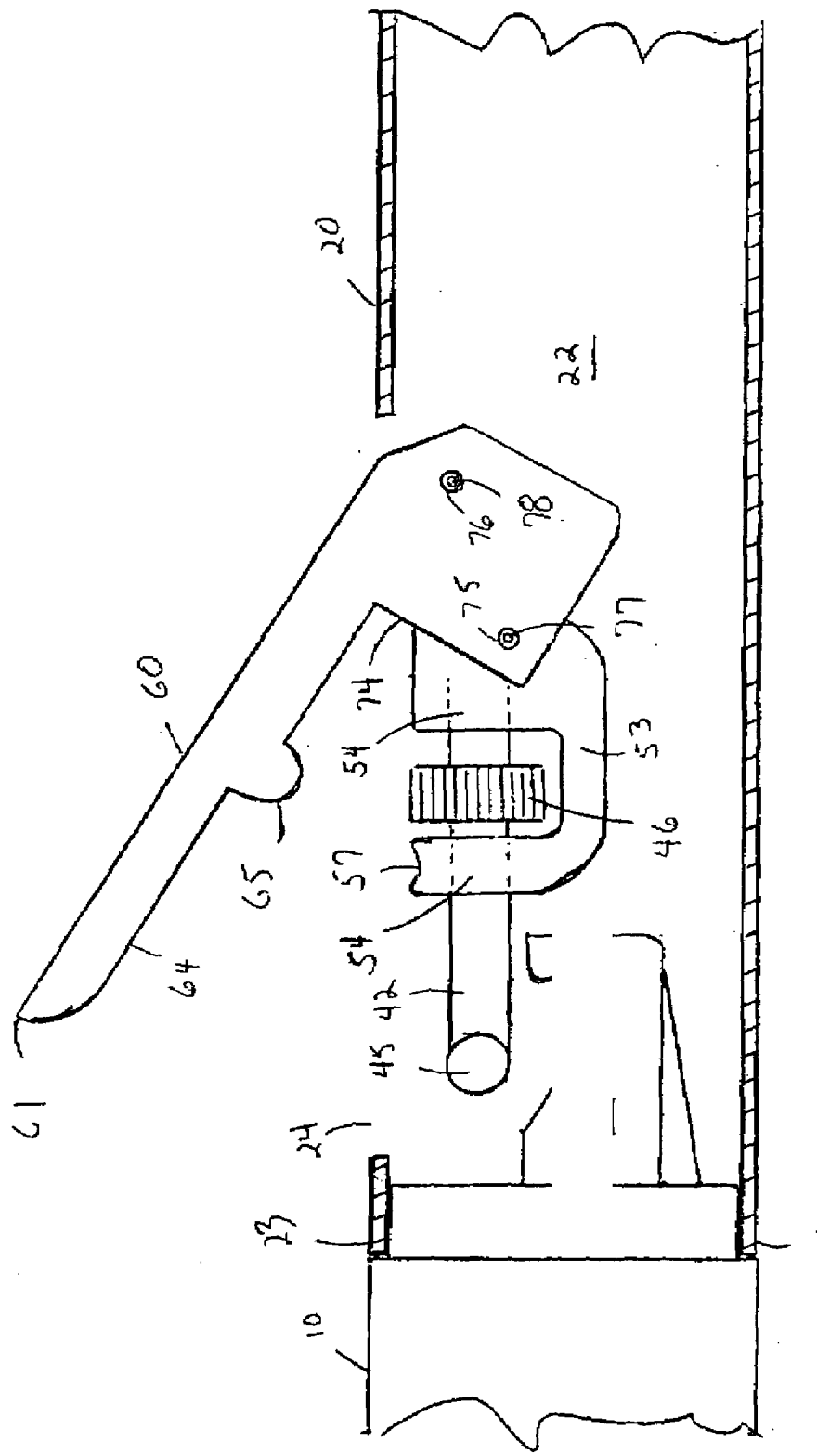
FIG. 3 is a cross sectional side view of the invention in a released position.

Referring to the drawings in detail wherein like elements are indicated by like numerals, there is shown a tube connector 1 constructed according to the principles of the present invention. The tube connector 1 is used in conjunction with an elongated hollow first section 10 having an external wall 11 defining a first section interior 12, a connection end portion 13 with an annular channel 14 formed in the external wall 11, and an opposite unconnected end 15, said end portion 13 and unconnected end 15 defining a first section longitudinal axis. The tube connector 1 is also used in conjunction with an elongated hollow second section 20 having an external wall 21 defining a second section interior 22, a connection end 23, and an opposite unconnected end 25, said connection end 23 and unconnected end 25 defining a second section longitudinal axis. The second section external wall 21 has an elongated open channel 24 formed therein and parallel to the second section longitudinal axis, said open channel 24 beginning near to the connection end 23 and extending a desired distance toward the second section unconnected end 25. The first section 10 and second section 20 have approximately the same diameters or cross sectional dimensions.

The invention hook apparatus 30 is comprised of a hook element 31 having a support end 32 and an opposite hook end 33, said ends defining a hook element longitudinal axis, said hook element longitudinal axis being coincident with the first section longitudinal axis. The hook element support end 32 is joined to the first section connection end portion 13. In this embodiment of the invention, the hook element 31 has an upper surface 34, an opposite lower surface 35, and two opposite sides 36. The hook element upper surface 34 is shaped in the form of a hook, with a first slope portion 37 extending downwardly from the support end 32, and a second slope portion 38 hooking upwardly at the hook end 33. The hook end 33 has a vertical aperture 39 formed therein with a depth reaching from the upper surface 34 downwardly to the first slope portion 37. The invention hook apparatus 30 is further comprised of a support element 19 attached to the first section connection end portion 13 and hook element lower surface 35.

The latching apparatus 40 is contained within the second section interior 22 and has a T-shaped element 41 comprised of an elongated element 42 with a free end 43 and a holding end 44 terminating in a crossbar 45. The elongated element 42 has a longitudinal axis defined by the free end 43 and holding end 44, said elongated element longitudinal axis being parallel to the longitudinal axis of the second section 20. The crossbar 45 lies in a plane parallel to the plane of the hook element upper surface 34. The elongated element 42 has a thumb screw 46 attached thereto.

The elongated element 42 is held in a U-shaped holder 50 within the second section interior 22, said holder 50 having an engagement leg 51, a connector leg 52, and a base portion 53 joining both legs, said legs 51, 52 defining a holder longitudinal axis, said legs 51, 52 having tops 57, 58 opposite the base portion 53, said holder longitudinal axis being parallel with the second section longitudinal axis. Each of the holder legs 51, 52 has a circular aperture 54 formed therein, each said circular aperture 54 having a central axis coincident with the central axis of the other circular aperture, each said central axis being parallel to the longitudinal axis of the second section 20. The elongated element 42 is adapted to being inserted into the leg circular apertures 54, said elongated element free end 43 being inserted into the connector leg circular aperture 54. The elongated element thumb screw 46 is positioned between the legs 51, 52. The U-shaped holder connector leg 52 has a second circular aperture 55 formed therein, said second aperture 55 having a central axis transverse to the longitudinal axis of the second section 20.

The latching apparatus 40 is further comprised of an elongated lever element 60 having a front end 61, a rear end 62, a top side 63, a bottom side 64, and a rear connection section 70, said front end 61 and rear end 62 defining a latching apparatus longitudinal axis. The latching apparatus longitudinal axis is parallel to the second section longitudinal axis. The rear connection section 70 has a generally rectangular shape with a top defined by the lever element top side 63 and a rear defined by the lever element rear end 62. The rear connection section 70 has a bottom 71, an open forward side 72, and two opposite side panels 73, said side panels 73, open forward side 72, rear 62 and top 63 defining a hollow interior 74. The side panels 73 each have a lower aperture 75 and an upper aperture 76 formed therein, said apertures 75, 76 in one side panel having a central axis coincident with the apertures 75, 76 of the opposite panel. The lever element bottom side 64 has a downwardly extending protrusion 65 approximately midway between the lever element front 61 and the rear connection section forward side 72.

The lever element rear connection section 70 is adapted to being fitted partly over the U-shaped holder connector leg 52 covering the leg top 58, a portion of said connector leg 52 being enclosed within the rear connection section hollow interior 74. The rear connection section side panel lower apertures 75 are aligned with the connector leg second aperture 55. The rear connection section 70 is pivotally joined to the U-shaped holder connector leg 52 by a first pin 77 inserted through the rear connection section side panel lower apertures 75 and connector leg second aperture 55. The lever element 60 is positioned within the second section open channel 24. A second pin 78 is inserted through the rear connector section side panel upper apertures 76 and into the second section wall 21.

In operation, the lever element front 61 is pulled up away from the open channel 24. The first section 10 is joined to the second section 20, said second section wall 21 overlapping the first section annular channel 14, and turned so that the plane of the hook element upper surface 34 is parallel to the plane of the latching apparatus T-shaped element 41. The T-shaped cross bar 45 will be positioned over the hook element upper surface 34. The lever element front 61 is then closed downwardly toward the second section open channel 24. The T-shaped element elongated element 42 then moves into the hook end aperture 39, while the crossbar 45 slides downwardly against the hook element first slope portion 37. The action of the lever element rear connection section 70 rotating about the second pin 78 pulls the U-shaped holder downwardly and away from the first section 10. The latching apparatus cross bar 45 thereby fully engages the hook element 31. Adjustment for fit can be made by manipulation of the thumb screw 46. In the fully locked position, the lever element top side 63 lies in a plane approximately coincident with the second section wall 21. In the fully locked position, the lever element downwardly extending protrusion 65 rests on the U-shaped holder engagement leg top 57.

It is understood that the above-described embodiment is merely illustrative of the application. Other embodiments may be readily devised by those skilled in the art which will embody the principles of the invention and fall within the spirit and scope thereof.

I claim:

1. A tube connector for connecting an elongated hollow first section, said first section having a first section external wall defining a first section interior, a first section connection end portion with an annular channel formed in the external wall, and a first section opposite unconnected end, said end portion and unconnected end defining a first section longitudinal axis, to an elongated hollow second section having a second section external wall defining a second section interior, a second section connection end, and a second section opposite unconnected end, said second connection end and said second unconnected end defining a second section longitudinal axis, said second section external wall having an elongated open channel formed therein and parallel to the second section longitudinal axis, said open channel beginning near to the second section connection end, said first section and second section having identical cross sectional dimensions, comprising:

a hook apparatus joined to said first tubular section, said hook apparatus comprised of a hook element having a support end and an opposite hook end, said ends defining a hook element longitudinal axis, said hook element longitudinal axis being coincident with the first section longitudinal axis, said hook element support end being joined to the first section connection end portion, said hook element having an upper surface, an opposite lower surface, and two opposite sides, said hook element upper surface being shaped in the form of a hook, with a first slope portion extending downwardly from the upper surface toward the lower surface, and a second slope portion hooking upwardly from said first slope portion at the hook end to the upper surface, said hook end having a vertical aperture formed therein with a death reaching from the upper surface downwardly to the first slope portion; and a latching apparatus joined to said second tubular section, said latching apparatus comprised of:

a T-shaped element comprised of an elongated element with a free end and a holding end terminating in a crossbar, said free end and holding end defining an elongated element longitudinal axis, said elongated element longitudinal axis being parallel to the longitudinal axis of the second section, said crossbar laying in a plane parallel to the plane of the hook element upper surface;

a U-shaped holder having an engagement leg, a connector leg, and a base portion joining both legs, said legs defining a holder longitudinal axis, said legs having tops opposite the base portion, said holder longitudinal axis being parallel with the second section longitudinal axis, each of the holder legs having a first circular aperture formed therein, each said first circular aperture having a central axis coincident with the central axis of the other first circular aperture, each said central axis being parallel to the longitudinal axis of the second section, said connector leg having a second circular aperture formed therein, said second aperture having a central axis transverse to the longitudinal axis of the second section, wherein said elongated element is positioned within the leg first circular apertures, said elongated element free end being positioned within the connector leg first circular aperture;

an elongated lever element having a front end, a rear end, a top side, a bottom side, and a rear connection section, said front end and rear end defining a latching apparatus longitudinal axis, said latching apparatus longitudinal axis being parallel to the second section longitudinal axis, said rear connection section having a generally rectangular shape with a top defined by the lever element top side and a rear defined by the lever element rear end, said rear connection section having a bottom, an open forward side, and two opposite side panels, said side panels, rear and top defining a hollow interior, each said side panel having a lower aperture and an upper aperture formed therein, said apertures in one side panel having a central axis coincident with the apertures of the opposite side panel;

wherein the lever element rear connection section is fitted partly over the U-shaped holder connector leg covering the connector leg top, a portion of said connector leg being enclosed within the rear connection section hollow interior, said rear connection section side panel lower apertures being aligned with the connector leg second aperture, said rear connection section being pivotally joined to the U-shaped holder connector leg by a first pin inserted through the rear connection section side panel lower apertures and connector leg second aperture, said lever element being positioned within the second section open channel;

a second pin inserted through the rear connector section side panel upper apertures and into the second section wall;

wherein the latching apparatus of the second tubular section removably engages the hook apparatus of the first tubular section;

wherein said second tubular section covers the engaged latching apparatus and hook apparatus.

2. A tube connector as recited in claim 1, wherein:

said lever element bottom side has a downwardly extending protrusion approximately midway between the lever element front and the rear connection section forward side, wherein in a fully locked position, the lever element downwardly extending protrusion rests on the U-shaped holder engagement leg top.

3. A tube connector as recited in claim 2, wherein:

the hook apparatus is further comprised of a support element attached to the first section connection end portion and hook element lower surface.

* * * * *